July 31, 1945.  S. A. MOSS  2,380,777
TURBOSUPERCHARGER SYSTEM
Filed May 4, 1942
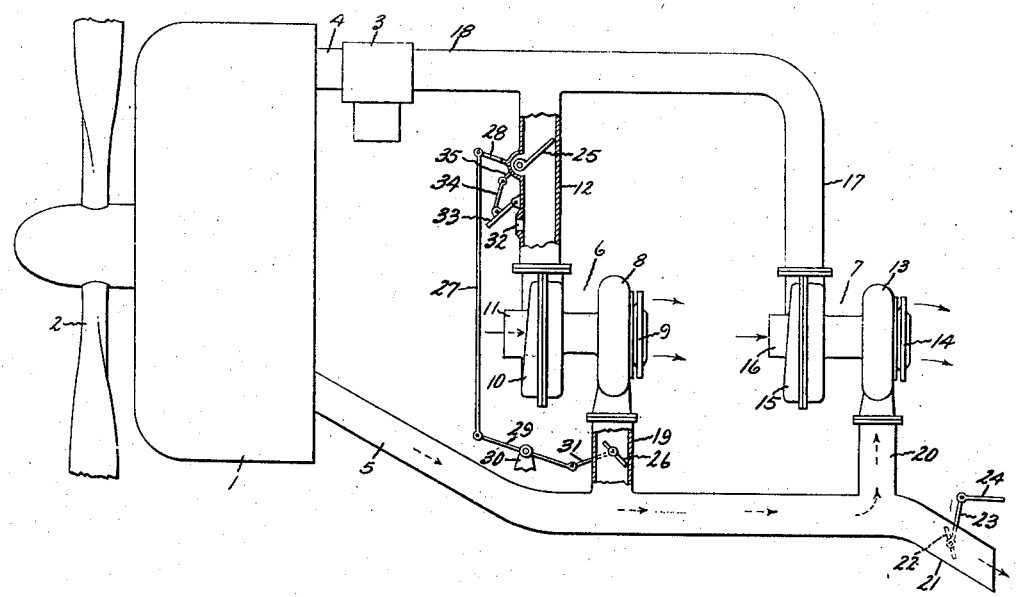
Inventor:
Sanford A. Moss,
by Harry E. Dunham
His Attorney.

Patented July 31, 1945

2,380,777

UNITED STATES PATENT OFFICE 2,380,777

TURBOSUPERCHARGER SYSTEM

Sanford A. Moss, Lynn, Mass., assignor to General Electric Company, a corporation of New York Application May 4, 1942, Serial No. 441,715

13 Claims. (Cl. 60—13)

In turbosupercharger installations occasions arise where it becomes desirable to operate a plurality of turbosuperchargers in parallel by the exhaust gas from an aircraft power plant. My invention has to do with installations of this type, although it is not limited thereto necessarily.

The object of my invention is to provide an improved construction and arrangement in an installation of the type referred to and for a consideration of what I believe to be novel and my invention, attention is directed to the following specification and the claims appended thereto.

In the drawing, the figure is a diagrammatic view of a turbosupercharger installation embodying my invention.

Referring to the drawing, 1 indicates a part of an aircraft in which is enclosed an internal combustion engine which drives a propeller 2. The carburetor for the engine is indicated at 3 from which the explosive mixture is conveyed to the intake manifold of the engine through a conduit 4. Connected with the exhaust manifold of the engine is a conduit 5 for conveying exhaust gases to the turbosuperchargers.

6 and 7 indicate two turbosuperchargers connected in parallel. The nozzle box for supercharger 6 is indicated at 8, the turbine wheel is indicated at 9, and the centrifugal compressor is indicated at 10. The air intake for the compressor 10 is indicated at 11 and the discharge conduit is indicated at 12. The nozzle box for turbosupercharger 7 is indicated at 13, the turbine wheel is indicated at 14, and the centrifugal compressor is indicated at 15. The inlet for compressor 15 is indicated at 16 and the discharge conduit is indicated at 17. Discharge conduits 12 and 17 are connected in parallel to the carburetor 3 by a conduit 18. Nozzle boxes 8 and 13 are connected to exhaust gas conduit 5 by conduits 19 and 20, respectively. Connected with conduit 5 is a waste conduit 21 in which is located a suitable waste gate valve 22 which regulates the flow of exhaust gases to the nozzle boxes. When waste gate valve 22 is wide open, the exhaust gases from the engine discharge directly to atmosphere, little if any gases passing through the respective nozzle boxes. This represents the condition of no load on the superchargers. As waste gate valve 22 is gradually closed, more and more of the gases are directed to the nozzle boxes from whence they are discharged through the rings of nozzles to the turbine wheels. Maximum load condition obtains when the waste gate valve is completely closed, all the gases being then directed to the turbine wheels. Waste gate valve 22 may be controlled in any suitable manner, either manually or automatically. In the present instance, it is shown as being provided with a crank arm 23 to which is connected a rod 24 which may go to the means for positioning the waste gate valve.

It is known that when two centrifugal compressors are operated in parallel, if the load on them as imposed by external conditions is such as to require both of them, they operate with complete stability. If, however, the load is so light as to bring the two compressors near their pulsation points, then one tends to take all the load and to drive the other backwards. The point at which pulsation starts in a compressor is known as the breakdown point and depends upon a number of factors, including the volume and the pressure.

According to my invention, I select two compressors having somewhat different characteristic curves, one having a pulsation point or breakdown point somewhat ahead of the other and I then provide the one compressor which has the earlier breakdown point with means for shutting down the flow of air through it and means for shutting off the flow of operating gas to it when the load on the compressors reaches such a low value that the breakdown point of the one compressor is approached.

In the present instance, the compressor 10 has a breakdown point or pulsation point ahead of the compressor 15 and according to my invention, I provide in discharge conduit 12 a valve 25 for shutting off the flow of air through conduit 12 and in conduit 19 a valve 26 for shutting off the flow of gases to nozzle box 8. Valves 25 and 26 are connected together by a link 27 which at one end is connected to an arm 28 fixed on the spindle of valve 25 and at the other end is connected to one end of a lever 29 mounted on a fixed pivot 30 and having its other end pivotally connected to an arm 31 on the spindle of valve 26. Thus, the two valves 25 and 26 are constrained to move together, being opened and closed simultaneously. Preferably, I provide in the conduit 12 an aperture 32 which is open to atmosphere and which is normally closed by a valve 33 connected by a link 34 to an arm 35 on the valve spindle of valve 25, the arrangement being such that when valve 25 is closed, valve 33 is opened and vice versa.

During normal operation, valves 25 and 26 stand in wide open position and valve 33 closes aperture 32. The arrangement is such that valve 25 is biased toward closed position and is held open by the flow of air through conduit 12. With normal loads obtaining, valves 25 and 26 will both be open and exhaust gases from conduit 5 will be supplied to both nozzle boxes 8 and 13, the two turbosuperchargers operating in parallel. Now, if the load decreases to a point approaching the pulsation or breakdown point of centrifugal compressor 10, the flow of air through conduit 12 will decrease to a point such that valve 25 will drop to closed position, the movement of valve 25 simultaneously effecting the closing of valve 26 and the opening of valve 33. This shuts down supercharger 6 whereupon the entire load is assumed by supercharger 7. Preferably, the arrangement is such that valve 26, when moved to closed position, does not completely close conduit 19 but permits sufficient gas to flow past it to operate supercharger 6 at an idling speed. The uncovering of aperture 32 permits sufficient air flow through compressor 10 to prevent its overheating. Preferably, the idling speed at which supercharger 6 is operated is sufficiently high to enable it to again take its part of the load promptly when occasion demands. Now, so long as the load imposed externally is one so small that only one supercharger is required to carry it, the operation continues as just described, the supercharger 7 carrying the entire load. If now the load on supercharger 7 increases, the pressure produced by it gradually decreases and when the load increases to a value such that the pressure delivered by the compressor 10 is less than the light load or idling load pressure maintained by supercharger 6, valve 26 will be opened by the air pressure in conduit 12 whereupon the two superchargers will again begin to operate in parallel.

Thus, by my invention, I am enabled to operate two turbosuperchargers in parallel without pulsation occurring until the load decreases to a value at which it reaches the breakdown pressure of the second compressor, in the present instance the compressor 10.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,

1. In combination, a plurality of superchargers each comprising a gas turbine and a centrifugal compressor, means for supplying gases to the turbines in parallel from a source of supply, means connecting the discharge sides of the compressors in parallel with each other to a point of consumption, and means operated automatically when the load on the compressors reaches a predetermined low value for idling one of the superchargers.

2. In combination, a plurality of superchargers each comprising a gas turbine and a centrifugal compressor, means for supplying gases to the turbines in parallel from a source of supply, means connecting the discharge sides of the compressors in parallel with each other to a point of consumption, and means operated automatically when the load on the compressors reaches a predetermined low value for closing the air discharge conduit of one supercharger and simultaneously shutting off the supply of gases thereto.

3. In combination, a plurality of superchargers each comprising a gas turbine and a centrifugal compressor, means for supplying gases to the turbines in parallel from a source of supply, means connecting the discharge sides of the compressors in parallel with each other to a point of consumption, one of said compressors having an earlier pulsation point than the other, and means for closing the air discharge conduit and for shutting off the supply of gases to the supercharger having the compressor with the earlier pulsation point when the load on the compressors reaches a predetermined low value.

4. The combination with an internal combustion engine, of a plurality of superchargers each comprising a centrifugal compressor having its discharge conduit connected to the engine intake and a gas turbine having its inlet connected to the engine exhaust, one of said compressors having an earlier pulsation point than the other, and means for automatically shutting down the supercharger having the compressor with the earlier pulsation point when the load on the compressors reaches a predetermined low value.

5. The combination with an internal combustion engine of a plurality of superchargers each comprising a centrifugal compressor having its discharge conduit connected to the engine intake and a gas turbine having its inlet connected to the engine exhaust, one of said compressors having an earlier pulsation point than the other, a valve in the discharge conduit of said one compressor, a valve in the inlet of the turbine which drives said one compressor, and means for automatically closing said valves when the load on the compressors reaches a predetermined low value.

6. In combination, a plurality of superchargers each comprising a gas turbine and a centrifugal compressor, means for supplying gases to the turbines in parallel from a source of supply, means connecting the discharge sides of the compressors in parallel with each other to a point of consumption, and means operated automatically when the load on the compressors reaches a predetermined low value for shutting off the flow of air through the discharge conduit of one supercharger and connecting such conduit to a region of lower pressure and simultaneously diminishing the supply of gases thereto to operate it at idling speed.

7. In combination, a plurality of superchargers each comprising a gas turbine and a centrifugal compressor, means for supplying gases to the turbines in parallel from a source of supply, means connecting the discharge sides of the compressors in parallel with each other to a point of consumption, one of said compressors having an earlier pulsation point than the other, and means for shutting off the flow of air through the discharge conduit of the supercharger having the compressor with the earlier pulsation point and connecting such conduit to a region of lower pressure when the load on the compressor reaches a predetermined low value, and simultaneously diminishing the supply of gases thereto to operate it at idling speed.

8. The combination with an internal combustion engine of a plurality of superchargers each comprising a centrifugal compressor having its discharge conduit connected to the engine intake and a gas turbine having its inlet connected to the engine exhaust, one of said compressors having an earlier pulsation point than the other, a valve in the discharge conduit of said one compressor, a valve in the inlet of the turbine which drives said one compressor, means for automatically closing said valves when the load on the compressors reaches a predetermined low value, and means effective when said valves are closed for operating said one compressor at idling speed and connecting its discharge in advance of said first named valve to a region of lower pressure.

9. The combination with an internal combustion engine of a plurality of superchargers each comprising a centrifugal compressor having its discharge conduit connected to the engine intake and a gas turbine having its inlet connected to the engine exhaust, one of said compressors having an earlier pulsation point than the other, valve means in the discharge conduit of said one compressor for shutting off the flow therethrough and connecting such conduit to a region of lower pressure, valve means in the inlet of the turbine which drives said one compressor, and means for effecting simultaneous operation of said valve means when the load on the compressor reaches a predetermined low value.

10. In combination, a plurality of units each comprising a prime mover and a centrifugal compressor, means for supplying actuating fluid to said prime movers in parallel from a source of supply, means connecting the discharge sides of the compressors in parallel with each other to a point of consumption, and means operated automatically when the load on the compressors reaches a predetermined low value for idling one of the units.

11. In combination, a plurality of units each comprising a prime mover and a centrifugal compressor, means for supplying actuating fluid to the prime movers in parallel from a source of supply, means connecting the discharge sides of the compressors in parallel with each other to a point of consumption, and means operated automatically when the load on the compressors reaches a predetermined low value for closing the air discharge conduit of one compressor and simultaneously shutting off the supply of actuating fluid thereto.

12. In combination, a plurality of units each comprising a prime mover and a centrifugal compressor, means for supplying actuating fluid to the prime movers in parallel from a source of supply, means connecting the discharge sides of the compressors in parallel with each other to a point of consumption, one of said compressors having an earlier pulsation point than the other, and means for closing the air discharge conduit and for shutting off the supply of actuating fluid to the unit having the compressor with the earlier pulsation point when the load on the compressors reaches a predetermined low value.

13. In combination, a plurality of units each comprising a centrifugal compressor and a driving means therefor, means connecting the discharge sides of the compressors in parallel with each other to a point of consumption, and means operated automatically when the load on the compressors reaches a predetermined low value for shutting off the flow of air through the discharge conduit of one compressor and simultaneously shutting down the driving means therefor.

SANFORD A. MOSS.